(12) United States Patent
Mora et al.

(10) Patent No.: US 8,026,100 B2
(45) Date of Patent: Sep. 27, 2011

(54) METHOD OF DETERMINING LIFETIME OF A NANOTUBE-PRODUCING CATALYST

(75) Inventors: Elena Mora, Columbus, OH (US); Avetik Harutyunyan, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 699 days.

(21) Appl. No.: 12/108,566

(22) Filed: Apr. 24, 2008

(65) Prior Publication Data

US 2008/0292532 A1 Nov. 27, 2008

Related U.S. Application Data

(60) Provisional application No. 60/913,808, filed on Apr. 24, 2007.

(51) Int. Cl.
*G01N 23/00* (2006.01)
(52) U.S. Cl. ............................................ 436/37; 436/57
(58) Field of Classification Search .................... 436/37, 436/57
See application file for complete search history.

(56) References Cited

U.S. PATENT DOCUMENTS

2006/0257566 A1* 11/2006 Fan et al. .................. 427/248.1

OTHER PUBLICATIONS

Ago, H., Uehara, N., Yoshihara, N., Tsuji, M., Yumura, M., Tomonaga, N. and Setoguchi, T., "Gas analysis of the CVD process for high yield growth of carbon nanotubes over metal-supported catalysts," Carbon, vol. 33 (2006) pp. 2912-2918, Elsevier Ltd.

Harutyunyan, A.R., Mora, E., Tokune, T., Bolton, K., Rosen, A., Jiang, A., Awasthi, N., and Curtarolo, S., "Hidden features of the catalyst nanoparticles favorable of single-walled carbon nanotube growth," Applied Physics Letters, vol. 90, p, 163120, (2007), American Institute of Physics.
A. Moisala, A.G. Nasibulin and E. I. Kauppinen, "The role of metal nanoparticles in the catalytic production of single-walled carbon nanotubes—a review", J. Phys.: Conderns. Matter. 15, S3011 (2003).
A.-C. Dupuis, "The catalyst in the CCVD of carbon nanotubes—a review", Progr. Mater. Sci. 50, 929 (2005).
D. Takagi, Y. Homma, H. Hibino, S. Suzuki, and Y. Kobayashi, "Single-Walled Carbon Nanotube Growth from Highly Activated Metal Nanoparticles", Nano Letters 6, 2639 (2006).
W. Zhou, Z. Han, J. Wang, Y. Zhang, Z. Jin, X. Sun, Y. Zhang, C. Yan and Y. Li, "Copper Catalyzing Growth of Single-Walled Carbon Nanotubes on Substrates", Nano Letters 6, 2987 (2006).
C.L.Cheung, A. Kurtz, H. Park and C. M. Lieber, "Diameter-Controlled Synthesis of Carbon Nanotubes", J. Phys. Chem B 106, 2429 (2002).
L. Jodin, A.-C. Dupuis, E. Rouviere, and P. Reiss, "Influence of the Catalyst Type on the Growth of Carbon Nanotubes via Methane Chemical Vapor Deposition", J. Phys. Chem B 110, 7328 (2006).
A. R. Harutyunyan, T. Tokune, E. Mora, J-W. Yoo, and A.J. Epstein, "Evolution of catalyst particle size during carbon single walled nanotube growth and its effect on the tube characteristics", J.Appl. Phys. 100, 044321 (2006).

(Continued)

*Primary Examiner* — Jill Warden
*Assistant Examiner* — Monique Cole
(74) *Attorney, Agent, or Firm* — Capitol City TechLaw, PLLC; Mark E. Duell

(57) ABSTRACT

The present teachings are directed toward methods of determining the lifetime of a catalyst for producing carbon nanotubes. The methods include providing different isotopically-labeled reaction components, primarily hydrocarbon sources containing different carbon isotopes, to the catalyst and measuring the Raman spectra of the carbon nanotubes produced with the different hydrocarbon sources.

23 Claims, 6 Drawing Sheets

OTHER PUBLICATIONS

D. N. Futaba, K. Hata, T. Yamada, K. Mizuno, M. Yumura and S. Iijima, "Kinetics of Water-Assisted Single-Walled Carbon Nanotube Synthesis Revealed by a Time-Evolution Analysis", Phys. Rev. Lett. 95, 056104 (2005).

D. H. Kim, H. S. Jang, C.D. Kim, D.S. Cho, H.S. Yang, H.D. Kang, B-K. Min, and H.-R.Lee, "Dynamic Growth Rate Behavior of a Carbon Nanotube Forest Characterized by in Situ Optical Growth Monitoring", Nano Letters. 3, 863 (2003).

K. Liu, K. Jiang, C. Feng, Z. Chen and S. Fan, "A growth mark method for studying growth mechanism of carbon nanotube arrays", Carbon 43, 2850 (2005).

Q. Li, X. Zhang, R.F. DePaula, L. Zheng, Y. Zhao, L. Stan, T. G. Holesinger, P. N. Arendt, D. E. Peterson, and Y. T. Zhu, "Sustained Growth of Ultralong Carbon Nanotube Arrays for Fiber Spinning", Adv. Mater. 18, 3160 (2006).

L. Liu and S. Fan, "Isotope Labeling of Carbon Nanotubes and Formation of 12C-13C Nanotube Junctions", J. Am. Chem Soc. 123, 11502 (2001).

S. Fan, L. Liu, and M. Liu, "Monitoring the growth of carbon nanotubes by carbon isotope labelling", Nanotechnology 14, 1118 (2003).

A. R. Hartutyunyan, B. K. Pradhan, U. J. Kim, G. Chen, and P. C. Eklund, "CVD Synthesis of Single Wall Carbon Nanotubes under "Soft" Conditions", Nano Letters 2, 525 (2002).

Y. Miyauchi and S. Maruyama, "Identification of an excitonic phonon sideband by photoluminescence spectroscopy of single-walled carbon-13 nanotubes", Phys. Rev. B 74, 035415 (2006).

* cited by examiner

METHOD OF DETERMINING LIFETIME OF A NANOTUBE-PRODUCING CATALYST

RELATED APPLICATIONS

The present application claims benefit from earlier filed U.S. Provisional Application No. 60/913,808, filed Apr. 24, 2007, which is incorporated herein in its entirety by reference for all purposes.

BACKGROUND

1. Field of the Invention

The present teaching relate to a method for determining the catalyst lifetime for catalysts producing single walled carbon nanotubes, (hereinafter "SWNTs"). The method is based on analysis of Raman spectra of nanotubes obtained by sequential introduction of isotopically-labeled reaction components, such as, gases $^{12}CH_4$ and $^{13}CH_4$, at different stages of catalyst activity during nanotube production. The growth of the nanotubes can be evaluated by mass spectrometry.

The present teachings also relate to the modification of catalyst composition, for example, using Fe/Mo instead of Fe, that can increase the lifetime approximately three times and thereby increasing the yield of the SWNT. An increase of 100° C. in the synthesis temperature shortened the lifetime from, for example, about 35 minutes to about 10 minutes, however the growth rate increased resulting in a similar overall yield of SWNT. No evidence of lifetime changes was found when the carbon feedstock varied on the order of 8 times, but instead resulted in variation of the amount of disorder carbon formed.

2. Discussion of the Related Art

Catalytic chemical vapor deposition (CCVD) is considered the most controllable and versatile method for the growth of carbon nanotubes. Along with the traditional iron-based family of catalysts and co-catalysts for the growth of SWNT, new families of noble metal-based catalysts (Pt, Pd, Au, Ag), together with Cu, have been reported. This brings more diversity and complexity to the elucidation of the catalyst features favorable for nanotube growth, since catalyst properties and parameters like preparation method, pretreatment, diameter and their crystallographic and electronic structure have a remarkable influence on nanotube growth.

Among catalyst properties, the lifetime is a key characteristic, especially for growing long tubes needed for particular applications. Previously reported approaches for estimation of the catalyst lifetime are mainly based on post synthesis measurements of the nanotubes' length with time.

Methods include monitoring in-situ height during growth of the SWNT, and inducing growth marks during growth of multi-walled carbon nanotube (hereinafter "MWCNT") arrays.

All of the above reported approaches are generally applicable for individual tubes or very well aligned forests of tubes, where the length of the nanotube can be measured. A need exists for a simple method that allows one to evaluate the period of catalyst activity and determine the duration favorable for the growth of SWNTs. Of particular interest are methods for studying and determining the catalyst lifetime for bulk growth of SWNTs. Additionally, a need exists for understanding the dependence of the catalyst lifetime on, such factors as, for example, catalyst composition and different nanotube synthesis parameters.

SUMMARY OF THE PRESENT DISCLOSURE

The present teachings are directed to a method of measuring the lifetime of a catalyst for producing carbon nanotubes by providing first and second independent samples of a catalyst suitable to produce carbon nanotubes, and exposing independently each of the first and second independent catalyst samples to a first hydrocarbon source containing predominantly a first isotope of carbon therein for a first and a second time period, respectively. The first hydrocarbon source is allowed to react to produce a first portion of carbon nanotubes containing the first isotope of carbon at each of the first and second independent catalyst samples. Then, exposing independently each of the first and second independent catalyst samples to a second hydrocarbon source containing predominantly a second isotope of carbon therein for a third and fourth time period, respectively, and allowing the second hydrocarbon source to react to produce a second portion of carbon nanotubes containing the second isotope of carbon at each of the first and second independent catalyst samples. The physical properties of the carbon nanotubes grown at the first and second independent catalyst samples are measured to determine the lifetime of the catalyst. In this method, the lengths of the first, second, third and fourth time periods are independently varied, and the first and the second catalyst are each exposed to a hydrocarbon source until carbon nanotubes are no longer produced.

The present teachings also include a method for reducing the amount of disordered carbon product present in carbon nanotubes by providing a catalyst for producing carbon nanotubes, determining the lifetime of the catalyst for producing carbon nanotubes, and then providing a hydrocarbon source. The hydrocarbon source is then exposed to the catalyst for a time period determined by the lifetime of the catalyst, producing carbon nanotubes at the catalyst from the hydrocarbon source, and then isolating the carbon nanotubes.

Also taught by this present disclosure is a method of measuring the lifetime of a catalyst for producing carbon nanotubes including the steps of providing first and second independent samples of a catalyst suitable to produce carbon nanotubes, exposing independently each of the first and second independent catalyst samples to a first hydrocarbon source containing predominantly a first isotopically labeled component therein for a first and a second time period, respectively, and then allowing the first hydrocarbon source to react to produce a first portion of carbon nanotubes containing the first isotopically labeled component at each of the first and second independent catalyst samples. Each of the first and second independent catalyst samples are then exposed independently to a second hydrocarbon source containing predominantly a second isotopically labeled component therein for a third and fourth time period, respectively, and then allowing the second hydrocarbon source to react to produce a second portion of carbon nanotubes containing the second isotopically labeled component at each of the first and second independent catalyst samples. Finally, the physical properties of the carbon nanotubes grown at the first and second independent catalyst samples are measured to determine the lifetime of the catalyst.

The present teachings are directed to a method that allows for evaluation of the period of catalyst activity and revelation of the duration favorable for the growth of SWNTs. The method can be based in the analysis of the Raman spectra of independent samples synthesized by replacing $^{12}CH_4$ gas with $^{13}CH_4$ gas, or vice versa, at different stages of the growth process. The Raman spectra of SWNTs obtained from $^{13}C$ methane are similar to those from the $^{12}C$ isotope, however, with a frequency shift $(12/13)^{1/2}$ times smaller, as the heavier carbon atoms yield smaller phonon energies. Thus, the contribution from both isotopes in the different stages of the growth can be distinguished. The absence of the $^{13}C$ contribution in the Raman spectrum implies that the catalyst was no longer active for nanotube growth allowing for an adequate determination of the lifetime of the catalyst for nanotubes growth.

The present method is directed to determination of the catalyst lifetime for bulk grown SWNTs. The dependence of the catalyst lifetime on its composition and on different synthesis parameters is also of interest.

BRIEF DESCRIPTION OF THE DRAWINGS

The accompanying drawings which are included to provide a further understanding of the present disclosure and are incorporated in and constitute a part of this specification, illustrate various embodiments of the present disclosure and together with the detailed description serve to explain the principles of the present disclosure. In the drawings.

DETAILED DESCRIPTION OF THE PREFERRED EMBODIMENTS

Figure 1:
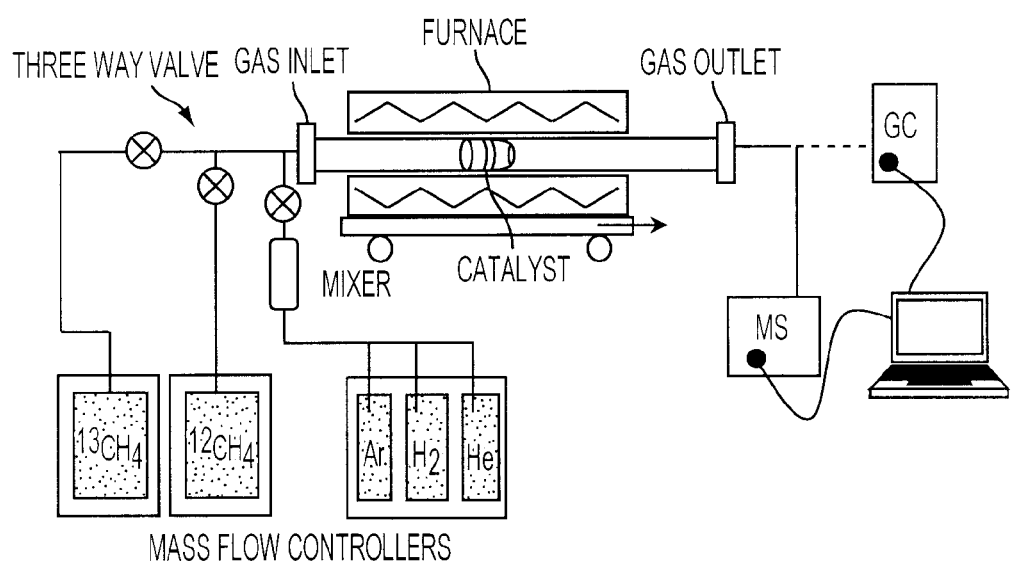
FIG. 1 is a schematic of the CCVD set-up.

The present teachings are directed to a method of measuring the lifetime of a catalyst for producing carbon nanotubes by providing first and second independent samples of a catalyst suitable to produce carbon nanotubes, exposing independently each of the first and second independent catalyst samples to a first hydrocarbon source containing predominantly a first isotope of carbon therein for a first and a second time period, respectively, and reacting the first hydrocarbon source to produce a first portion of carbon nanotubes containing the first isotope of carbon at each of the first and second independent catalyst samples. The first and second independent catalyst samples are then each independently exposed to a second hydrocarbon source containing predominantly a second isotope of carbon therein for a third and fourth time period, respectively, and reacting the second hydrocarbon source to produce a second portion of carbon nanotubes containing the second isotope of carbon at each of the first and second independent catalyst samples. Then, measuring the physical properties of the carbon nanotubes grown at the first and second independent catalyst samples to determine the lifetime of the catalyst. In the present teachings, the lengths of the first, second, third and fourth time periods are independently varied, and the first and the second catalyst are each exposed to a hydrocarbon source until carbon nanotubes are no longer produced.

The present method is also directed to methods producing single-walled carbon nanotubes. Additionally, in the present method, the first isotope of carbon can be carbon-12, and the second isotope of carbon can be carbon-13.

The catalysts can include an iron catalyst supported on alumina, or in some instances, an iron-molybdenum catalyst supported on alumina. Suitable first and second hydrocarbon sources for the presently disclosed method can include methane and ethylene.

The physical properties of carbon nanotubes, grown at the first and second catalyst samples, that are measured can include an observable physical property affected by the difference in carbon isotope. One example of a suitable physical property can include Raman spectroscopic measurements.

The second hydrocarbon source can be reacted with the first and second catalyst samples until carbon nanotubes containing the second isotope of carbon are no longer produced. Furthermore, in the presently taught method, the first and the second time periods can be not equal to one another, and, in other embodiments of the presently taught method, the third and the fourth time periods can also be not equal to one another.

Also provided by the present teachings is a method for reducing the amount of disordered carbon product present in carbon nanotubes by providing a catalyst for producing carbon nanotubes, and then determining the lifetime of the catalyst for producing carbon nanotubes, if not already known. A hydrocarbon source is then provided and the catalyst is exposed to the hydrocarbon source for a time period determined by the lifetime of the catalyst. Carbon nanotubes are produced at the catalyst from the hydrocarbon source, and the carbon nanotubes are then isolated from the catalyst. These carbon nanotubes produced by this method are expected to have lower amounts of undesired carbon by-products present.

In this method, the time period of exposure of the catalyst to the hydrocarbon source can be shorter than, longer than, or equal to the lifetime of the catalyst.

Further provided by the present disclosure is a method of measuring the lifetime of a catalyst for producing carbon nanotubes including providing first and second independent samples of a catalyst suitable to produce carbon nanotubes, exposing independently each of the first and second independent catalyst samples to a first hydrocarbon source containing predominantly a first isotope of carbon therein for a first and a second time period, respectively, and reacting the first hydrocarbon source to produce a first portion of carbon nanotubes containing the first isotope of carbon at each of the first and second independent catalyst samples. Then, exposing independently each of the first and second independent catalyst samples to a second hydrocarbon source containing predominantly a second isotope of carbon therein for a third and fourth time period, respectively, and reacting the second hydrocarbon source to produce a second portion of carbon nanotubes containing the second isotope of carbon at each of the first and second independent catalyst samples. The physical properties of the carbon nanotubes grown at the first and second independent catalyst samples are measured and used to determine the lifetime of the catalyst. In this method, the total time of the first and the third time periods can be sufficiently long that the first catalyst no longer produces carbon nanotubes, and the total time of the second and the fourth time periods can be sufficiently long that the second catalyst no longer produces carbon nanotubes.

In this presently disclosed method, the first and second hydrocarbon sources can include first and second different isotopically labeled components other than carbon, and, in some embodiments, each component can also be at least one member selected from the group consisting of carbon-12 and carbon-13.

The presently disclosed method is also directed to methods producing single-walled carbon nanotubes. In this present method, the catalysts can include an iron catalyst supported on alumina, or in some instances, an iron-molybdenum catalyst supported on alumina. Suitable first and second hydrocarbon sources for the presently disclosed method can include methane and ethylene.

The physical properties of carbon nanotubes, grown at the first and second catalyst samples, that are measured can include an observable physical property affected by the difference in carbon isotope. One example of a suitable physical property can include Raman spectroscopic measurements.

The second hydrocarbon source can be reacted with the first and second catalyst samples until carbon nanotubes containing the second isotope of carbon are no longer produced. Furthermore, in the presently taught method, the first and the second time periods can be not equal to one another, and, in other embodiments of the presently taught method, the third and the fourth time periods can also be not equal to one another.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Experimental

SWNTs can be grown by passing $CH_4$ over an Fe/Mo catalyst supported on alumina powder prepared by a common impregnation method. The catalyst can have a molar ratio of Fe:Mo:$Al_2O_3$ of 1:0.21:15, and a BET surface area of approximately 43 $m^2$/g, as prepared in the preparation method reported in Nano Letter, Vol. 2, p. 525 (2002) by A. R. Harutyunyan, B. K. Pradhan, U. J. Kim, G. Chen, and P. C. Eklund.

A schematic of a suitable CCVD apparatus that can be used for the synthesis is shown in FIG. 1. The reactor consists of a quartz tube of 13 mm of diameter and 1 m of length, with a mass spectrometer (MS) attached at the gas outlet in order to in-situ follow the catalyst activity during the experiments. The small volume of this reactor was selected as it allows for higher detection signals in the MS as the $H_2$ formed will be diluted into a smaller overall volume. In this experimental set-up, the catalyst is packed on a quartz capsule using stainless steel mesh (width of opening 35 μm), instead of lying on a quartz boat placed touching the bottom of the reactor, as it is usually reported for CCVD preparation methods. This configuration forces the gases to pass through the catalyst powder, ensuring a more complete reaction and similar accessibility for the hydrocarbon gas.

In a typical experiment, approximately 100 mg of reduced catalyst were placed inside the quartz reactor, but outside of the furnace zone. $CH_4$ gas was then supplied (3-80 sccm) and the furnace ramped up. When the desired temperature (720-820° C.) was reached, the sample was rapidly moved into the hot zone by sliding the furnace over specially designed rails. After completion of the synthesis, the $CH_4$ gas was turned off and the reactor cooled down under Ar gas (80 sccm). Reduction of the catalyst was conducted prior to the synthesis, by reducing the catalyst at 500° C. under a flow of $H_2$ and He gases (40 and 100 sccm, respectively) for 1 hour.

For the sequential introduction of isotopically labeled, $^{12}CH_4$ and $^{13}CH_4$, gases, two different gas lines equipped with three way valves were used in order to minimize any discontinuity in the gas supply, and provide accurate timing of the switching of gases. See FIG. 1. Any possible contribution from the stainless steel mesh in the decomposition of the hydrocarbon was studied at the highest temperature used (820° C.) in the experiments, and was observed to be negligible according to the MS and Raman spectroscopy results.

Raman scattering measurements, with laser excitations of 532 and 785 nm, were done in a Thermo Nicolet Almega Raman spectrometer equipped with a CCD detector. The carbon up-take was determined by temperature programmed oxidation (TPO) in a TA Instruments 2960 thermogravimetrical analyzer.

The mass spectrometer, attached at the gas outlet of the CCVD reactor, allowed tracking of the catalyst activity in-situ by recording the $H_2$ formed in the decomposition of the hydrocarbon gas ($CH_4 \leftrightarrow 2H_2+C$, $\Delta H=74.4$ KJ/mol). The curve shown in FIG. 2(a) was obtained during the growth of SWNTs at 780° C. using a $CH_4$ flow of 80 sccm. The catalyst showed a high activity, or increase in the production of $H_2$, during the first 5 minutes of the synthesis, followed by a decrease of activity, as seen in the decrease of $H_2$ in the subsequent 10 minutes, reaching the initial baseline after about 20-25 min of synthesis. The catalyst lifetime was then estimated between 20-25 min under these experimental conditions.

FIGS. 2(a)-2(d) illustrate the hydrogen concentration evolution during SWNT growth with Fe:Mo:$Al_2O_3$ at the following reaction conditions: (a) 780° C. with 80 sccm $CH_4$, (b) 780° C. with 3 sccm $CH_4$, (c) 720° C. with 80 sccm of $CH_4$ and (d) 820° C. with 80 sccm of $CH_4$, respectively. The inset in panel (a) corresponds to an experiment with sequential introduction of $^{12}CH_4$ (10 minutes) and $^{13}CH_4$ (10 minutes).

Figure 2A:
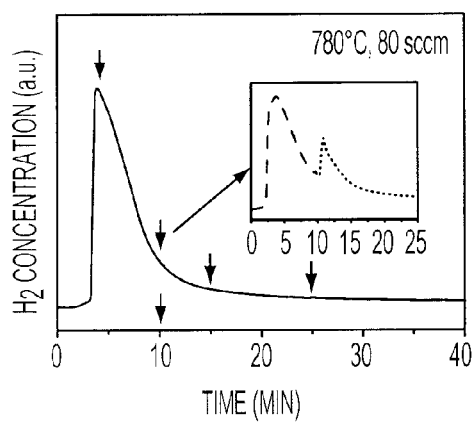
FIGS. 2(a)-2(d) are charts of hydrogen concentration evolution during SWNT growth with Fe:Mo:Al$_2$O$_3$ at various reaction conditions. The inset in FIG. 2(a) corresponds to an experiment with sequential introduction of $^{12}$CH$_4$ (10 minutes) and $^{13}$CH$_4$ (10 minutes)

In order to establish the duration of catalyst activity particularly favorable for nanotube growth, that is, the lifetime of the catalyst, independent catalyst samples were prepared, and exposed to a hydrocarbon source, under the same experimental conditions but using sequential introduction of $^{12}CH_4$ and $^{13}CH_4$ gases at different stages of the growth process, and their Raman spectra analyzed. The change between gases was done at various times including when the catalyst showed high, low and zero activity, respectively, according to the MS result. An example of the MS curves obtained in one of those experiments is shown in the inset of FIG. 2(a), which corresponds to a synthesis performed at 780° C. using 80 sccm of $^{12}CH_4$ for 9 minutes (dashed line) followed by 20 minutes of $^{13}CH_4$ (dotted line.) The discontinuity observed in the curve is due to the slight pressure change during the switching of the gases and, accordingly permits an accurate determination of the time when the gas change was initiated.

When a contribution from both C isotopes was observed in the Raman spectrum of the resulting SWNT, the present theory is that the catalyst was still active at the time the change of gas was made. However, when contribution from the carbon isotope introduced last, usually $^{13}C$, was not observed, then the catalyst was already deactivated by the time this second gas was supplied to the catalyst.

Example 1

Samples of Fe:Mo:Al$_2$O$_3$ were exposed at 780° C. to a methane flow of 80 sccm, with replacement of $^{13}$CH$_4$ by $^{12}$CH$_4$ at times when the catalyst showed high activity [4 minutes, FIG. 3(a1)], low activity [9-15 minutes, FIG. 3(a2) and FIG. 3(a3)] and no activity [25 minutes, FIG. 3(a4)] according to the MS results.

Figure 3A:
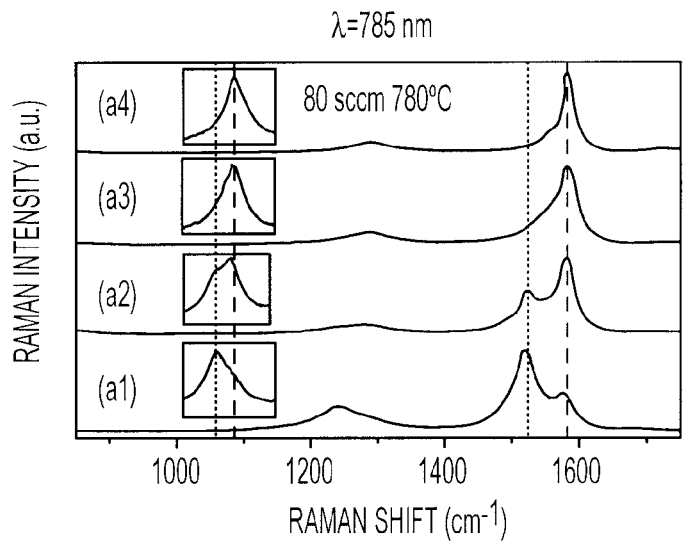
FIGS. 3(a)-3(c) are Raman spectra for SWNT samples grown on Fe:Mo:Al$_2$O$_3$ at various reaction conditions and with sequential introduction of $^{12}$CH$_4$ and $^{13}$CH$_4$ gases. The insets are magnifications showing the "D-band"

FIG. 3(a) are the Raman spectra for SWNT samples grown on Fe:Mo:Al$_2$O$_3$ at 780° C. and 80 sccm of CH$_4$ by sequential introduction of $^{12}$CH$_4$ and $^{13}$CH$_4$ gases for various time periods, respectively:

FIG. 3(a1) 4 minutes of $^{12}$CH$_4$ and 20 minutes of $^{13}$CH$_4$,
FIG. 3(a2) 9 minutes of $^{12}$CH$_4$ followed by 20 minutes of $^{13}$CH$_4$,
FIG. 3(a3) 15 minutes of $^{12}$CH$_4$ followed by 20 minutes of $^{13}$CH$_4$,
FIG. 3(a4) 25 minutes of $^{12}$CH$_4$ followed by 20 minutes of $^{13}$CH$_4$.

Figure 3B:
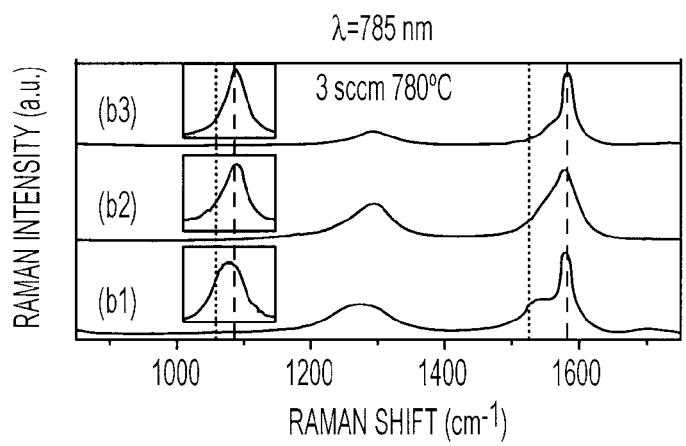

FIG. 3(b) are the Raman spectra for SWNT samples grown on Fe:Mo:Al$_2$O$_3$ at 780° C. and 3 sccm of CH$_4$ by sequential introduction of $^{12}$CH$_4$ and $^{13}$CH$_4$ gases for various time periods, respectively:

FIG. 3(b1) 10 minutes of $^{12}$CH$_4$ and 20 minutes of $^{13}$CH$_4$,
FIG. 3(b2) 20 minutes of $^{12}$CH$_4$ followed by 20 minutes of $^{13}$CH$_4$,
FIG. 3(b3) 30 minutes of $^{12}$CH$_4$ followed by 20 minutes of $^{13}$CH$_4$.

Figure 3C:
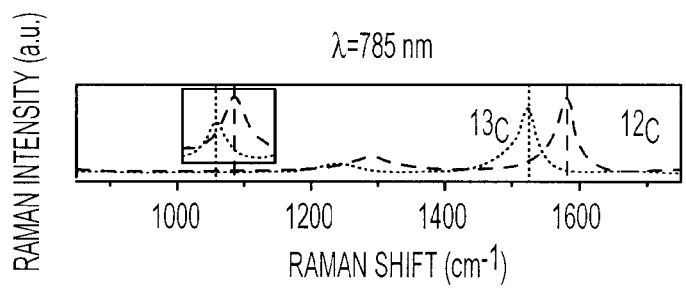

FIG. 3(c) is the Raman spectra for SWNTs grown on Fe:Mo:Al$_2$O$_3$ catalyst by sequential introduction of $^{12}$CH$_4$ and $^{13}$CH$_4$ gases for 20 minutes of $^{12}$CH$_4$ (dashed line) and 20 minutes of $^{13}$CH$_4$ (dotted line). The insets are magnifications showing the "D-band."

The Raman spectra of the samples obtained using $^{12}$CH$_4$ for 4 and 9 minutes followed by 20 minutes with $^{13}$CH$_4$ (See FIGS. 3(a1) and 3(a2)) showed a contribution from $^{13}$C atoms in both the G- and the D-band. On the other hand, the sample prepared using $^{12}$CH$_4$ for 15 minutes followed by 20 minutes of $^{13}$CH$_4$, showed little contribution from $^{13}$C atoms (See FIG. 3(a3)).

The contribution from the $^{13}$C atoms in the Raman spectra was less significant when increasing the time period that $^{12}$CH$_4$ was fed into the reactor. This result indicates that the activity of the catalyst decreased after about 5 minutes of synthesis, in agreement with the MS result. The Raman spectra of samples obtained when using $^{12}$CH$_4$ for 25 minutes or more, followed by 20 minutes with $^{13}$CH$_4$, did not show any significant contribution from $^{13}$C atoms, indicating that the catalyst was not active after 25 minutes of synthesis [See FIG. 3(a4)]. The catalyst lifetime was estimated to be approximately 20±5 minutes, and correlated very well with the estimation from the H$_2$ formation curve obtained with the MS during the synthesis.

In the present method, a more accurate determination of the catalyst lifetime favorable for SWNTs growth can be obtained with more experiments, using shorter time steps, in the time period between from when $^{13}$C contribution was last observed and then when $^{13}$C contribution was first not observed (for these specific examples, 15 minutes and 25 minutes, respectively, at a flow rate of 80 sccm) in the Raman spectrum of the SWNT.

The results described above show that SWNT synthesis with sequential introduction of hydrocarbon gas with different isotopes combined with Raman measurements provide a determination of the catalyst lifetime, and its correlation with carbon nanotube growth. In order to understand how synthesis parameters affect this catalyst feature, analogous experiments were performed as the ones reported herein, but under different conditions, such as different flow rates or temperatures. In addition, the effect of the catalyst composition on lifetime was also examined, and the results are presented below.

Figure 2B:
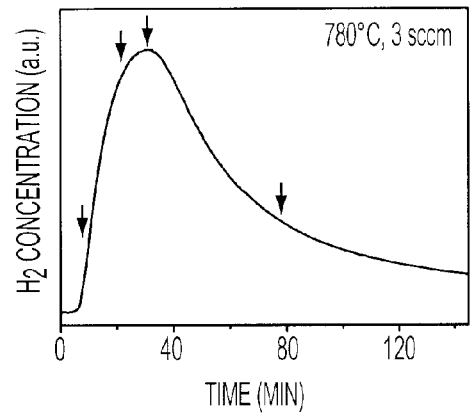
Figure 2C:
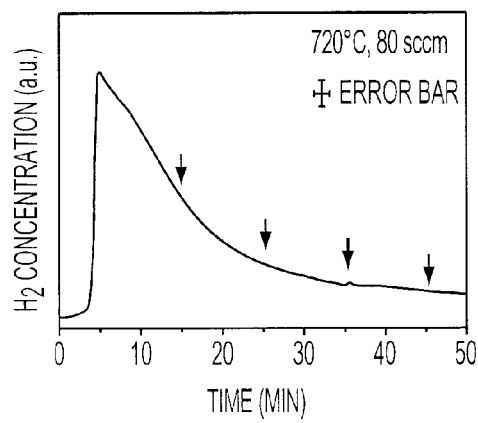
Figure 2D:
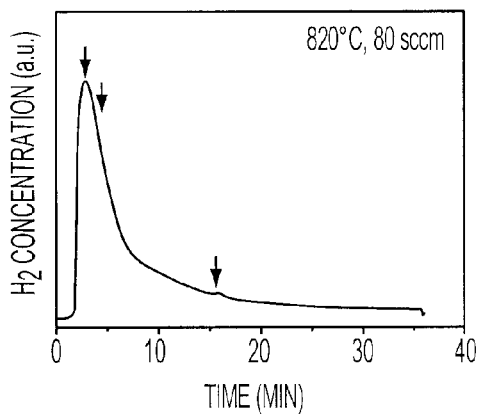

The MS curve shown in FIG. 2(b) corresponds to the formation of H$_2$ during the growth of SWNTs at 780° C. using 3 sccm of CH$_4$ gas. As in the case of using 80 sccm of CH$_4$ gas, the curve showed an increase in the H$_2$ concentration, followed by a decrease attributed to a decrease in catalyst activity. These two curves present clear differences on the time scale. It appears that the same catalyst formulation stays active and is able to decompose the hydrocarbon for a longer period of time (about 120 vs. about 20 minutes) at the lower flow rate of 3 sccm compared to higher flow rate of 80 sccm.

In order to determine a reaction time duration favorable for nanotube growth, the impact of sequential introduction of $^{12}$CH$_4$ and $^{13}$CH$_4$ was analyzed. The Raman spectra of the samples thus prepared are shown in FIG. 3(b). It was found that the SWNT samples obtained by using $^{12}$CH$_4$ for 20 minutes or less had contribution from $^{13}$C atoms in the G-band, as well as in the D-band (for 3 sccm). This contribution was more intense with a shorter reaction time with $^{12}$CH$_4$.

In contrast, the samples obtained using 30 minutes or longer of $^{12}$CH$_4$ followed by 20 minutes of $^{13}$CH$_4$, did not show $^{13}$C contribution, indicating that the catalyst was already deactivated after 30 minutes of reaction with $^{12}$CH$_4$. Hence, the catalyst lifetime under these synthesis conditions was 25±5 minutes, around four times shorter than the 120 minutes estimated from the MS result. The result pointed out that the catalyst lifetime cannot always be accurately estimated from the MS results. For a certain volume of the reactor, if the total flow rate used is too low, as in the case of 3 sccm, there is a diffusion problem through the reactor and the results can be very sensitive to reaction design and dimensions. Therefore, the time scale in the MS curve cannot be always correlated with the catalytic property of the nanoparticles. The determined catalyst lifetime under 80 sccm methane gas flow rate was almost same, about 20 minutes, as well as the carbon up-take, determined by TPO (30.8 and 27.7 wt %, respectively).

However, the quality of the material grown appears to be quite different depending on the hydrocarbon flow rate. The TPO curves show a slight increase in the oxidation temperature with a decrease in the hydrocarbon flow rate, and the ratio between the intensities of the G- and D-bands ($I_G/I_D$) in the Raman spectra was found to be smaller for the sample obtained using the lowest flow rate of 3 sccm ($I_G/I_D$ of about 2), while with a flow rate of 80 sccm, the ratio $I_G/I_D$ equaled approximately 6.

Example 2

Figure 4A:
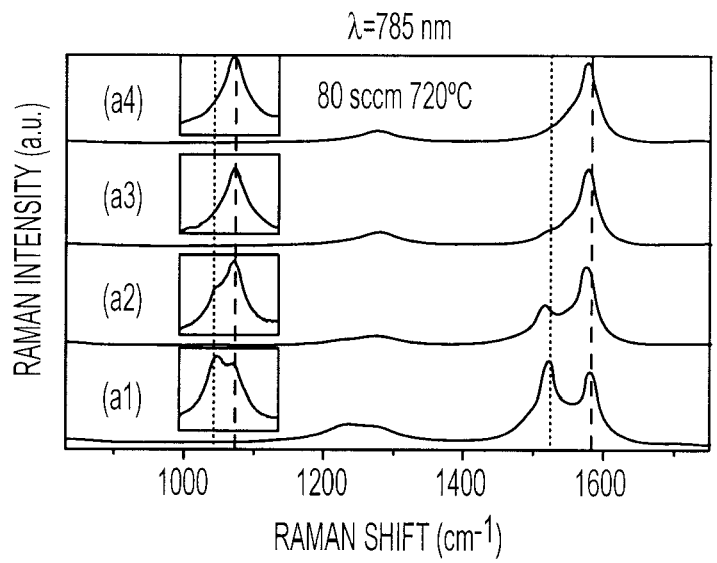
FIGS. 4(a)-4(c) are Raman spectra for SWNT samples grown on Fe:Mo:Al$_2$O$_3$ at various reaction conditions and with sequential introduction of $^{12}$CH$_4$ and $^{13}$CH$_4$ gases. The insets are magnifications showing the "D-band"

To study the effect of the catalyst and reaction temperature on the catalyst lifetime, SWNTs were grown at 720 and 820° C. using 80 sccm of CH$_4$ gas, and the results were compared with those of the synthesis at 780° C. reported above. The MS curves [FIGS. 2(a), (c) and (d)] showed that the catalyst lifetime increases with the decrease in temperature in the studied range. The Raman spectra of the SWNT samples obtained at 720 and 820° C. by sequential introduction of $^{12}$CH$_4$ and $^{13}$CH$_4$ gases are shown in FIGS. 4(a) and (b), respectively. According to the results, the lifetimes were determined to be about 40±5 minutes and about 10±5 minutes at 720 and 820° C., respectively, while for 780° C. the lifetime was determined to be about 20±5 minutes. These results demonstrate the impact of the catalyst temperature on the catalyst lifetime, with longer lifetimes observed at lower temperatures.

Figure 4B:
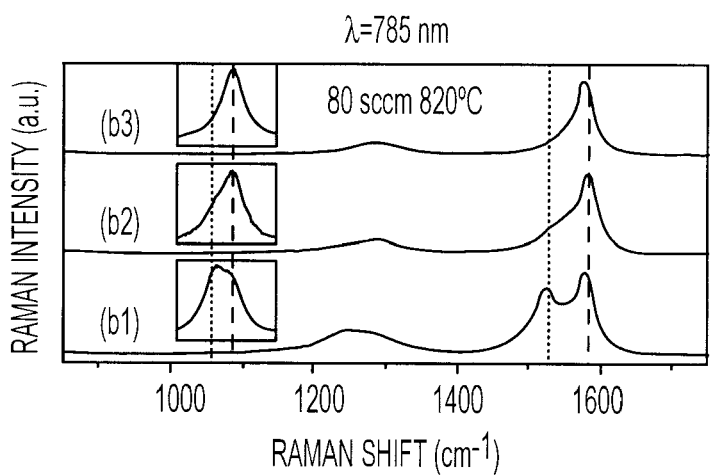
Figure 4C:
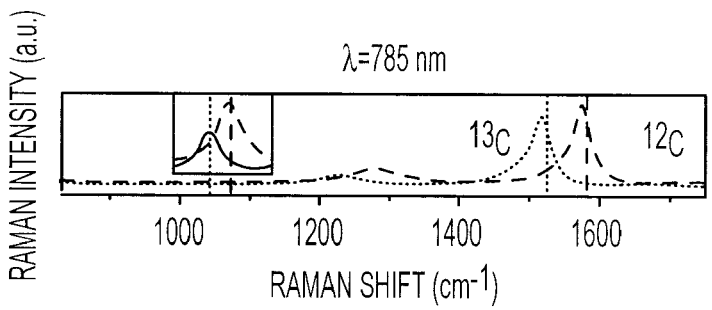

FIGS. 4(a)-4(c) are Raman spectra for SWNT samples grown on Fe:Mo:Al$_2$O$_3$ at 720° C. and 80 sccm of CH$_4$ with sequential introduction of $^{12}$CH$_4$ and $^{13}$CH$_4$ gases for various time periods, respectively:
  FIG. 4(a1) 15 minutes of $^{12}$CH$_4$ and 20 minutes of $^{13}$CH$_4$,
  FIG. 4(a2) 25 minutes of $^{12}$CH$_4$ followed by 20 minutes of $^{13}$CH$_4$,
  FIG. 4(a3) 35 minutes of $^{12}$CH$_4$ followed by 20 minutes of $^{13}$CH$_4$, and
  FIG. 4(a4) 45 minutes of $^{12}$CH$_4$ followed by 20 minutes of $^{13}$CH$_4$.

FIG. 4(b) are the Raman spectra for SWNT samples grown on Fe:Mo:Al$_2$O$_3$ at 820° C. and 80 sccm of CH$_4$ with sequential introduction of $^{12}$CH$_4$ and $^{13}$CH$_4$ gases for various time periods, respectively:
  FIG. 4(b1) 3 minutes of $^{12}$CH$_4$ and 20 minutes of $^{13}$CH$_4$,
  FIG. 4(b2) 5 minutes of $^{12}$CH$_4$ followed by 20 minutes of $^{13}$CH$_4$,
  FIG. 4(b3) 15 minutes of $^{12}$CH$_4$ followed by 20 minutes of $^{13}$CH$_4$.

FIG. 4(c) provides the Raman spectra for SWNTs grown on Fe:Mo:Al$_2$O$_3$ catalyst by sequential introduction of $^{12}$CH$_4$ and $^{13}$CH$_4$ gases for 20 minutes of $^{12}$CH$_4$ (dashed line) and 20 minutes of $^{13}$CH$_4$ (dotted line). The insets are magnifications showing the "D-band."

Example 3

Figure 5A:
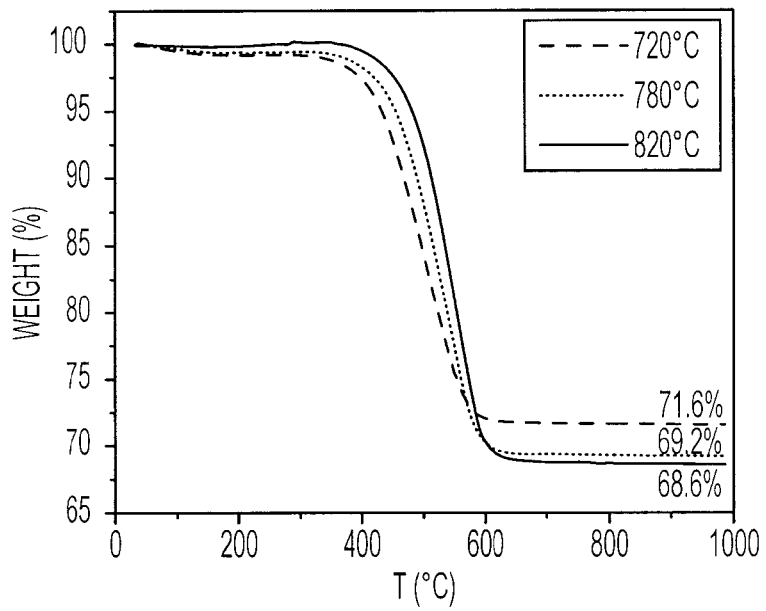
FIG. 5(a) is TPO curves and FIG. 5(b) is derivative profiles.
Figure 5B:
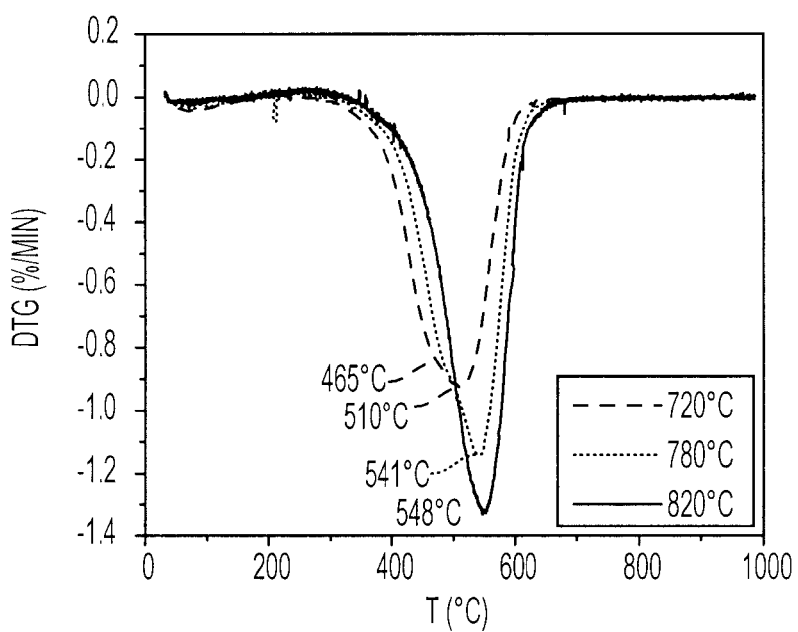

To understand the effect of longer catalyst lifetime on the yield of carbon deposition, and the effect of the catalyst temperature on the SWNT growth rate, the carbon uptake ("C-uptake") was measured by TPO. FIG. 5(a) provides the TPO curves and FIG. 5(b) is the derivative profiles, of the as-prepared carbon soot obtained at 720, 780 and 820° C. with 80 sccm of CH$_4$.

A slight increase of the C-uptake with the increase of the synthesis temperature was found (31.4, 30.8 and 28.4 wt % for 820, 780 and 720° C., respectively). According to Raman, TPO and TEM measurements, primarily SWNTs were synthesized in all cases, although the quality of the SWNTs was slightly better at higher temperature as the graphitization improves. Therefore, the fact that the catalyst lifetime was longer at the lower synthesis temperature, while the carbon up-take was similar in all the temperatures tested, can be explained by a faster SWNT growth rate with the increase in the temperature.

Example 4

The effect of catalyst composition on the catalyst lifetime was studied by comparing a Fe:Mo:Al$_2$O$_3$ catalyst and a catalyst containing only Fe (molar ratio Fe:Al$_2$O$_3$ of 1:15).

Figure 6A:
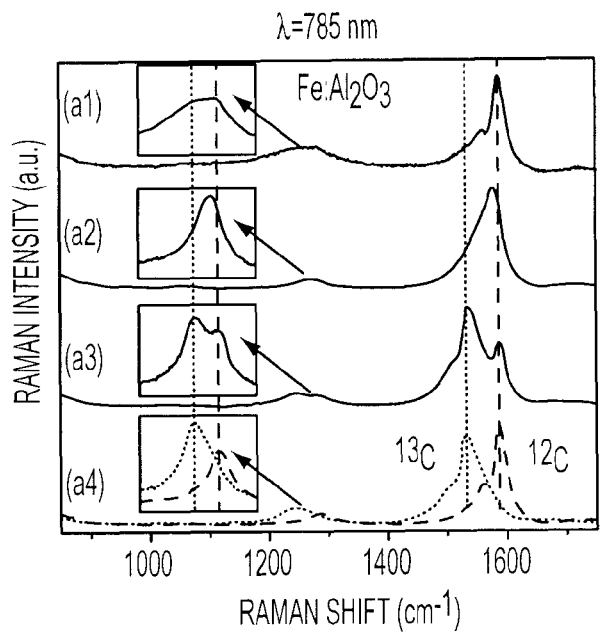
FIGS. 6(a) and 6(b) are Raman spectra for SWNTs grown on Fe catalyst or Fe:Mo catalyst with sequential introduction of $^{12}$CH$_4$ and $^{13}$CH$_4$ gases. The insets are magnifications showing the "D-band."
Figure 6B:
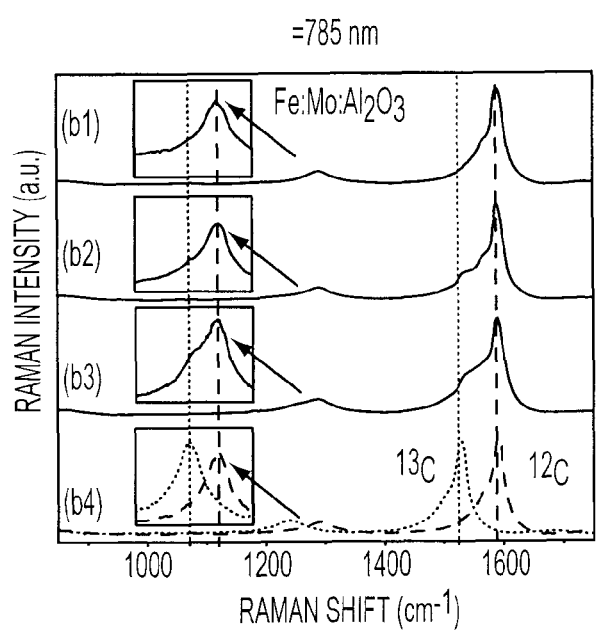

FIGS. 6(a) and 6(b) are the Raman spectra for SWNT grown on Fe and Fe:Mo catalysts with varying time periods of exposure to different isotopically labeled hydrocarbon reactants, here, $^{12}$CH$_4$ and $^{13}$CH$_4$ gases.

FIG. 6(a) provides the Raman spectra for SWNTs grown on Fe catalyst by sequential introduction of $^{12}$CH$_4$ and $^{13}$CH$_4$ gases for various time periods, respectively:
  FIG. 6(a1) 10 minutes of $^{12}$CH$_4$ followed by 20 minutes of $^{13}$CH$_4$,
  FIG. 6(a2) 7 minutes of $^{12}$CH$_4$ followed by 13 of minutes of $^{13}$CH$_4$,
  FIG. 6(a3) 3 minutes of $^{12}$CH$_4$ followed by 17 minutes of $^{13}$CH$_4$, and
  FIG. 6(a4) 20 minutes of $^{12}$CH$_4$ (dashed line) and 20 minutes of $^{13}$CH$_4$ (dotted line).

FIG. 6(b) provides the Raman spectra for SWNTs grown on Fe:Mo catalyst with sequential introduction of $^{12}$CH$_4$ and $^{13}$CH$_4$ gases for various time periods, respectively:
  FIG. 6(b1) 30 minutes of $^{12}$CH$_4$ followed by 10 minutes of $^{13}$CH$_4$,
  FIG. 6(b2) 20 minutes of $^{12}$CH$_4$ followed by 10 minutes of $^{13}$CH$_4$,
  FIG. 6(b3) 13 minutes of $^{12}$CH$_4$ followed by 10 minutes of $^{13}$CH$_4$, and
  FIG. 6(b4) 20 minutes of $^{12}$CH$_4$ (dashed line) and 20 minutes of $^{13}$CH$_4$ (dotted line). The insets are magnifications showing the "D-band."

The results from these experiments using sequential introduction of $^{12}$C and $^{13}$C labeled gases, at 820° C. using 60 sccm of CH$_4$ diluted in 200 sccm of Ar, showed that the catalyst lifetime of the bimetallic (Fe:Mo) catalyst was around three times longer than for the catalyst containing Fe only (25±4 and 7±2 minutes, respectively). It is worth noting that, for the Fe only catalyst, even though the catalyst was not active for SWNTs growth after 7±2 minutes, it was still active enough to decompose the hydrocarbon as observed by the D-band still showed contribution from $^{13}$C atoms [FIG. 6(a1)]. Therefore, in the case of the Fe only catalyst, the synthesis time should be restricted to time periods equal to or less than the catalyst lifetime in order to minimize the formation of the undesired sp$^2$ disordered carbon structures.

The present teachings provide a reliable and easy method for accurately determining the catalyst lifetime favorable for the growth of SWNTs. The method is based on the analysis of Raman spectra of SWNT samples produced by sequential introduction of hydrocarbon gas containing different C isotope (i.e. $^{12}$CH$_4$ and $^{13}$CH$_4$) at different stages of the catalyst activity, which is followed by mass spectrometry. Parameters like temperature and catalyst composition were observed to have a dramatic effect in the catalyst lifetime, while the hydrocarbon gas flow rate had a minimal one. The present teachings also provide increased catalyst lifetimes with a bimetallic catalyst (Fe/Mo) and lower reaction temperatures. Additionally, the present teachings provide methods of studying the effect on the catalyst lifetime of other parameters such as, for example, catalyst particle size, hydrocarbon or substrate.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of measuring the lifetime of a catalyst for producing carbon nanotubes comprising:
  providing first and second independent samples of a catalyst suitable to produce carbon nanotubes;

exposing independently each of the first and second independent catalyst samples to a first hydrocarbon source containing predominantly a first isotope of carbon therein for a first and a second time period, respectively;

allowing the first hydrocarbon source to react to produce a first portion of carbon nanotubes containing the first isotope of carbon at each of the first and second independent catalyst samples;

exposing independently each of the first and second independent catalyst samples to a second hydrocarbon source containing predominantly a second isotope of carbon therein for a third and fourth time period, respectively;

allowing the second hydrocarbon source to react to produce a second portion of carbon nanotubes containing the second isotope of carbon at each of the first and second independent catalyst samples; and measuring the physical properties of the carbon nanotubes grown at the first and second independent catalyst samples to determine the lifetime of the catalyst, wherein the lengths of the first, second, third and fourth time periods are independently varied, and the first and the second catalyst are each exposed to a hydrocarbon source until carbon nanotubes are no longer produced.

2. The method according to claim 1, wherein the carbon nanotubes comprise single-walled carbon nanotubes.

3. The method according to claim 1, wherein the first isotope of carbon comprises carbon-12.

4. The method according to claim 1, wherein the second isotope of carbon comprises carbon-13.

5. The method according to claim 1, wherein the catalyst comprises an iron catalyst supported on alumina.

6. The method according to claim 1, wherein the catalyst comprises an iron-molybdenum catalyst supported on alumina.

7. The method according to claim 1, wherein the first and the second hydrocarbon sources each comprise at least one member selected from the group consisting of methane and ethylene.

8. The method according to claim 1, wherein the measured physical properties of carbon nanotubes grown at the first and second catalyst samples comprise an observable physical property affected by the difference in carbon isotope.

9. The method according to claim 1, wherein measuring comprises Raman spectroscopic measurements.

10. The method according to claim 1, wherein the second hydrocarbon source is reacted with the first and second catalyst samples until carbon nanotubes containing the second isotope of carbon are no longer produced.

11. The method according to claim 1, wherein the first and the second time periods are not equal.

12. The method according to claim 1, wherein the third and the fourth time periods are not equal.

13. A method for reducing the amount of disordered carbon product present in carbon nanotubes comprising
providing a catalyst for producing carbon nanotubes;
determining the lifetime of the catalyst for producing carbon nanotubes;
providing a hydrocarbon source;
exposing the hydrocarbon source to the catalyst for a time period determined by the lifetime of the catalyst;
producing carbon nanotubes at the catalyst from the hydrocarbon source; and
isolating the carbon nanotubes.

14. The method according to claim 13, wherein the time period comprises a time period shorter than the lifetime of the catalyst.

15. The method according to claim 13, wherein the time period comprises a time period longer than the lifetime of the catalyst.

16. The method according to claim 13, wherein the time period comprises a time period equal to the lifetime of the catalyst.

17. A method of measuring the lifetime of a catalyst for producing carbon nanotubes comprising:
providing first and second independent samples of a catalyst suitable to produce carbon nanotubes;
exposing independently each of the first and second independent catalyst samples to a first hydrocarbon source containing predominantly a first isotopically labeled component therein for a first and a second time period, respectively;
allowing the first hydrocarbon source to react to produce a first portion of carbon nanotubes containing the first isotopically labeled component at each of the first and second independent catalyst samples;
exposing independently each of the first and second independent catalyst samples to a second hydrocarbon source containing predominantly a second isotopically labeled component therein for a third and fourth time period, respectively;
allowing the second hydrocarbon source to react to produce a second portion of carbon nanotubes containing the second isotopically labeled component at each of the first and second independent catalyst samples; and
measuring the physical properties of the carbon nanotubes grown at the first and second independent catalyst samples to determine the lifetime of the catalyst.

18. The method according to claim 17, wherein the total time of the first and the third time periods comprises a time period sufficiently long that the first catalyst no longer produces carbon nanotubes, and the total time of the second and the fourth time periods comprises a time period sufficiently long that the second catalyst no longer produces carbon nanotubes.

19. The method according to claim 17, wherein the first and second isotopically labeled components comprise different isotopically labeled components, and each isotopically labeled component comprises at least one member selected from the group consisting of carbon-12 and carbon-13.

20. The method according to claim 17, wherein the measured physical properties of carbon nanotubes grown at the first and second catalyst samples comprise an observable physical property affected by the isotope difference.

21. The method according to claim 17, wherein measuring comprises Raman spectroscopic measurements.

22. The method according to claim 17, wherein the first and the second time periods comprise time periods that are not equal.

23. The method according to claim 17, wherein the third and the fourth time periods comprise time period that are not equal.

* * * * *